United States Patent [19]

Lindemann

[11] 3,931,086

[45] Jan. 6, 1976

[54] THERMOSETTING ACRYLIC EMULSIONS BASED ON N-METHYLOL ALLYL CARBAMATES

[75] Inventor: Martin K. Lindemann, Greenville, S.C.

[73] Assignee: Chas. S. Tanner Co., Greenville, S.C.

[22] Filed: May 13, 1974

[21] Appl. No.: 469,565

[52] U.S. Cl. .............. 260/29.6 TA; 260/2.5 R; 260/29.4 UA; 260/29.6 NR; 260/29.6 RW; 260/77.5 BB; 260/851
[51] Int. Cl.² .................. C08F 16/04; C08L 61/20
[58] Field of Search ...... 260/29.6 TA; 29.6 RW; .. UA, 260/29.4 UA; 260/77.5 BB, 29.6 NR

[56] References Cited
UNITED STATES PATENTS

| | | |
|---|---|---|
| 2,865,893 | 12/1958 | Unruh et al................. 260/77.5 BB |
| 3,165,498 | 1/1965 | Bissinger...................... 260/77.5 BB |
| 3,222,419 | 12/1965 | Jubilee et al. .............. 260/29.6 RW |
| 3,238,167 | 3/1966 | Wolff et al. ................ 260/29.6 RW |
| 3,732,184 | 5/1973 | Lindemann et al.......... 260/77.5 BB |
| 3,852,233 | 12/1974 | Lindemann.................. 260/29.6 TA |

Primary Examiner—H. S. Cookeram
Attorney, Agent, or Firm—Dressler, Goldsmith, Clement & Gordon, Ltd.

[57] ABSTRACT

Thermosetting acrylic emulsions having more favorable curing properties are provided using reactive monomers in the largely acrylic emulsion copolymer, at least one-third of these reactive monomers being an N-methylol derivative of an allyl carbamate.

12 Claims, No Drawings

THERMOSETTING ACRYLIC EMULSIONS BASED ON N-METHYLOL ALLYL CARBAMATES

This invention relates to thermosetting acrylic emulsion systems possessing lowered curing temperature.

In the conventional systems, acrylic monomers, such as methyl methacrylate and butyl acrylate, are copolymerized in aqueous emulsion together with a reactive monomer such as N-methylol acrylamide. The resulting emulsions are useful for many purposes, such as textile binders and paints, but the emulsions require an excessively high curing temperature. It is clearly advantageous to lower the curing temperature since this saves energy and extends the utility of the emulsions to include situations where the textile fibers or other substrate is damaged by the more elevated curing temperature. Even when the same curing temperature is used, it is advantageous to be able to speed the cure.

In this invention, the N-methylol acrylamide is replaced by an N-methylol derivative of allyl or methallyl carbamate. It is found that even though the carbamate derivative is allylic whereas the bulk of the monomers being copolymerized are acrylic (just as acrylamide is acrylic), the carbamate derivative is satisfactorily incorporated in the emulsion copolymer to provide an excellent rapid cure which proceeds at a lower temperature than can be used for the corresponding N-methylol acrylamide copolymer.

As a feature of the invention, the N-methylol derivative is etherified with a $C_1 - C_8$ alcohol prior to copolymerization which decreases the water solubility of the derivative. The acrylic esters are strongly hydrophobic and the decreased solubility of the carbamates used herein appears to have offset the allylic character of the carbamate so that the copolymerization which is obtained is substantially as good as with the previously used N-methylol acrylamide. The further decrease in water solubility provided by etherification further enhances the copolymerization.

To further facilitate the cure, and in preferred practice, at least the first 35% of the monomers are subjected to an essentially adiabatic exotherm in order to force the production of linear copolymers of higher molecular weight which cure more readily and more extensively. For some purposes these cure prematurely during drying which interferes with subsequent operations as when the emulsion is whipped with air to form a foam which is dried, crushed, and then cured. When the N-methylol derivative is etherified with a $C_1 - C_8$ alcohol prior to copolymerization, this prevents cure before enough temperature is used to remove the ether moiety. In this way a system of increased stability at low temperature is combined with increased reactivity at lowered curing temperature. This adiabatic polymerization is more fully illustrated in U.S. Pat. No. 3,732,184 to me and Donald M. Wacome.

Referring more particularly to the monoethylenic monomers which are copolymerized in aqueous emulsion in accordance with this invention, acrylic esters are primarily contemplated, though methacrylic esters may also be used. Indeed, in the broader contemplation of this invention, the ester component may be constituted by any $C_1 - C_4$ alcohol esters of alpha, beta-monoethylenically unsaturated monocarboxylic acids. The various esters are illustrated by ethyl acrylate, butyl acrylate, isobutyl acrylate, butyl methacrylate, butyl crotonate, hexyl crotonate, and the like. $C_1 - C_8$ alcohol esters of acrylic acid, and methacrylic acid are primarily contemplated, these being used alone or in admixture with other nonreactive acrylic monomers, such as acrylonitrile, to constitute at least 65% of the weight of the polymer, preferably at least 85% thereof. Acrylic monomers are those in which the ethylenic group is terminally positioned and is alpha, beta to a carbon atom which carries an atom other than carbon or hydrogen. The monoethylenic esters discussed above desirably constitute at least 75% of the acrylic monomers. Small amounts, up to about 30% by weight, may be constituted by diverse copolymerizable monoethylenic monomers, such as styrene, vinyl toluene, vinyl acetate, vinyl chloride, vinylidene chloride, and the like.

It is particularly contemplated to utilize combinations of monomers which provide a $T_g$ below 20°C., more preferably below 0°C. down to about −60°C. A $T_g$ of from about −20°C. to 15°C. is preferred. $T_g$ denotes the glass transition temperature which can be measured directly or, as is more customary, it can be calculated from the known $T_g$ for the components of the copolymer in homopolymeric form.

The emulsion copolymers of this invention include from 0.2–15%, preferably from 0.5–10%, by weight of reactive monomers of which the essential component is an N-methylol derivative of an allyl carbamate. These can be etherified as pointed out hereinbefore, and have the formula:

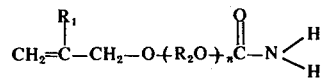

in which $R_1$ is hydrogen or methyl, $R_2$ is an alkylidene group containing from 2–4 carbon atoms, and $n$ is an integer from 0–10, preferably from 0–2.

Various allyl carbamates are useful herein, especially allyl carbamate and methallyl carbamate.

Allyl carbamate has the formula:

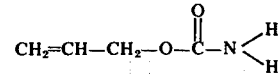

This monoethylenic monomer is not an amide and it will react with formaldehyde in an addition reaction with the two amino hydrogen atoms to generate the N-methylol group. When one molar proportion of formaldehyde is taken up, the derivative can be described by the formula:

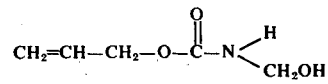

The same reaction can proceed to take up more formaldehyde to increase the functionality which is generated.

Regardless of whether one or two moles or formaldehyde are reacted into the molecule, the monomer is an allyl ester.

As previously indicated, the allyl carbamate may include ether groups between the allyl group and the carbamate group. These ethers can be provided by reacting the allyl alcohol with an alkylene oxide, such as ethylene oxide, before converting the resulting alcohol to the carbamate.

The adduction of the carbamate with formaldehyde is well known and conventional and yields N-methylol derivatives. These are a mixture of the mono-N-methylol adduct, the di-N-methylol adduct and unreacted carbamate which, if present, is not harmful.

The N-methylol groups may be left unreacted, or they may be etherified with a $C_1 - C_8$ alcohol, preferably a $C_1 - C_4$ alcohol. The alcohol is released on baking to regenerate the N-methylol group for cure, as is well known. Accordingly, ethers of the allyl carbamates are included herein. Preferred alcohols are propyl alcohol and butyl alcohol, including isopropyl alcohol and isobutyl alcohol. These alcohols form reasonably hydrophobic ethers which still break down to regenerate the N-methylol group at moderately low baking temperatures. Methyl alcohol, ethyl alcohol, 2-ethoxy ethanol, 2-butoxy ethanol, and 2-ethylhexanol are also useful.

While the N-methylol allyl carbamates described above may be used alone, they may also be used in admixture with various reactive monomers providing other reactive groups which may be reactive with the N-methylol group or which may simply be used in order to improve the emulsion polymerization or the adhesion of the coatings to a base. Thus, amides may be present, such as acrylamide or methacrylamide. Allyl carbamate itself may be present to provide amine functionality. Hydroxy monomers such as hydroxy ethyl acrylate or methacrylate may also be employed. It is also permissible to include a small proportion of from 0.1–3% of an acidic monomer such as acrylic acid, or methacrylic acid, or similar monoethylenic acid including vinyl sulfonic acid.

The N-methylol allyl carbamate should constitute at least about one-third of the total reactive monomers.

The emulsion copolymerization which is carried out in this invention has many conventional attributes and, indeed, it may be entirely conventional. Thus, the polymerization is normally carried out in the presence of emulsifying agents which may be anionic, cationic or nonionic, the nonionic agent being preferably used to constitute at least a portion of the emulsifying agents. From 0.1–6% of emulsifying agent is commonly employed, based on the total weight of monomers.

The emulsion copolymerization is normally carried out in the presence of a suitable free radical generating polymerization initiator which is activated by an oxidation-reduction (redox) reaction, e.g., redox catalysis. The redox catalysis of emulsion polymerizations is itself well known, and will be adequately illustrated in the examples.

The baking temperatures of the final coatings may vary considerably from about 200°F. to about 500°F. for various periods of time, ranging from 30 seconds at the highest temperature to about 1 hour at the lowest temperature. Again, the achievement in this invention is the lowering of the baking temperatures normally needed and/or the speeding of the cure at whatever temperature is selected.

In some instances it is desirable to include with the emulsion copolymers of this invention a proportion of aminoplast resin which enhances the cure. The class of aminoplast resins is itself wholly conventional, and is illustrated by reaction products of polyamines such as urea, melamine, or benzoguanamine, with excess formaldehyde. These may be etherified, if desired, and used in aqueous dispersion instead of in aqueous solution.

Dimethylol ethylene urea will further illustrate the materials which may be incorporated in the emulsions if desired.

The invention is illustrated in the examples which follow, it being understood that all parts in the examples, as well as in the claims, are by weight unless otherwise stated.

EXAMPLE 1

Production of N-Methylol Allyl Carbamate Solution 44 grams of allyl carbamate (0.5 mol) was added to 300 grams of water. The pH was adjusted to 11.5 with approximately 3 cc of a 50% sodium hydroxide solution after which 16.5 grams of paraformaldehyde were added. The mixture was heated to 75°C. and kept for three hours. An additional 6 cc of a 50% sodium hydroxide solution were added incrementally to maintain the pH at 11. The formaldehyde content was determined to be 0.4% after three hours reaction. The pH was then adjusted to 5 with sulfuric acid to provide the N-methylol derivative.

EXAMPLE 2

Production of Aqueous Emulsion 3502 pounds of the allyl carbamate solution of Example 1 (solids content 16.9%) are mixed with agitation with 766 pounds of a nonionic emulsifying agent (an ethylene oxide adduct with octyl phenol containing 40 moles of ethylene oxide per mole of octyl phenol), 57.75 pounds of itaconic acid, a solution of 35.5 pounds of diammonium phosphate in 109 pounds of water, 2296 pounds of acrylonitrile, and 9183 pounds of butyl acrylate. This provides an emulsion of monomers to which are added 9947 pounds of water and 96.5 pounds of the above identified nonionic emulsifying agent. One-half of this premixed emulsion is then pumped into a reactor and there is further added to the reactor 60 pounds of sodium persulfate and 45 grams of ferrous sulfate. The contents of the reactor are then mixed for 5 minutes whereupon 45 pounds of a reducing solution (a solution of five pounds sodium formaldehyde sulfoxylate in 40 pounds of water) are added to initiate polymerization. The temperature in the reactor rises to about 182°F. and then begins to subside. After the exotherm is over and the temperature begins to drop, the reactor is cooled to 100°F. to insure that the second exotherm will not be excessive. The remainder of the premixed emulsion is then added to the reactor together with 63 gallons of wash water and the contents of the reactor are agitated for 5 minutes whereupon an additional 45 pounds of reducing solution (5 pounds of sodium formaldehyde sulfoxylate dissolved in 40 pounds of water) are added and a second exotherm takes place causing the temperature to rise to about 160°F. The reactor contents are then cooled below 120°F. and 35.5 pounds of diammonium phosphate in 109 pounds of water are added. The product is then cooled to below 100°F. and stored.

The aqueous emulsion produced as described above is suitable as a binder for textile fibers and it cures to the same or better insolubilization as does the product of Example 2 of U.S. Pat. No. 3,732,184, in which methylol acrylamide is used. The curing temperature needed for adequate cure is reduced about 10°F.

EXAMPLE 3

Example 2 is repeated, with the exception that the proportion of acrylonitrile is reduced to constitute 10% of total nonreactive monomer, and the butyl acrylate content is reduced to constitute 40% of the total nonreactive monomers. The balance of the nonreactive monomers is then provided by methyl methacrylate. The polymerization is conducted as described in Example 2, with the proportion of the carbamate solution being adjusted to provide 2% by weight of N-methylol allyl carbamate, based on the nonreactive monomers. The product is an air drying paint, which cures slowly at room temperature to provide superior weather resistance, which is especially useful in an outdoor paint.

EXAMPLE 4

Example 2 is repeated again, with the exception that the acrylonitrile content is raised to constitute 30% of total nonreactive monomers, and the butyl acrylate content is reduced to 70% of total nonreactive monomers, the polymerization again being conducted as described in Example 2. The salts contained in the emulsion product are then removed by ion exchange, and the product is blended with a heat-hardening butylated melamine-formaldehyde condensate in a proportion to provide 15% of the butylated melamine-formaldehyde resin, based on the total weight of binder. This emulsion is suitable for coil coat application.

EXAMPLE 5

Example 2 is again repeated, but this time utilizing the propyl ether of N-methylol allyl carbamate in place of the unetherified product used in Example 2. The emulsion polymerization is otherwise unchanged, providing a product which has greater resistance to partial cure on extended air drying.

The emulsions of this invention may be used clear or pigmented as desired, pigmentation being fully conventional. Similarly, numerous additives may be utilized in the emulsions for all sorts of purposes, as is well known in the art of emulsion copolymerization. Thus, flow control agents, defoamers, thickeners, catalysts, and the like may be present.

The invention is defined in the claims which follow.

I claim:

1. A thermosetting acrylic emulsion comprising water having dispersed therein an emulsion copolymer of monoethylenic monomers at least 65% of which are nonreactive acrylic monomers, and from 0.2–15% of reactive monomers at least about one-third of which are an N-methylol derivative, or a $C_1 - C_8$ alcohol ether thereof, of an allyl carbamate having the formula:

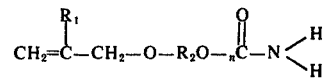

in which $R_1$ is hydrogen or methyl, $R_2$ is an alkylidene group containing from 2–4 carbon atoms, and $n$ is an integer from 0–10.

2. An emulsion as recited in claim 1 in which said acrylic monomers constitute at least 85% of the copolymer.

3. An emulsion as recited in claim 1 in which at least 75% of the acrylic monomers are $C_1 - C_8$ alcohol esters of alpha, beta-monoethylenically unsaturated monocarboxylic acids.

4. An emulsion as recited in claim 1 in which said acrylic monomers constitute at least 85% of the copolymer, and at least 75% of the acrylic monomers are $C_1 - C_8$ alcohol esters of acrylic acid or methacrylic acid providing a $T_g$ below 20°C.

5. An emulsion as recited in claim 4 in which the copolymer has a $T_g$ below 0°C. down to about −60°C.

6. An emulsion as recited in claim 5 in which the N-methylol derivative or the ether thereof is a derivative of N-methylol allyl carbamate and said reactive monomers are present in an amount of from 0.5–10%.

7. An emulsion as recited in claim 6 in which the propyl or butyl ether of N-methylol allyl carbamate is used.

8. An emulsion as recited in claim 6 in which said emulsion copolymer is formed by subjecting at least the first 35% of the monomers to an essentially adiabatic exotherm.

9. An emulsion as recited in claim 1 in which said emulsion further includes an aminoplast resin.

10. A thermosetting acrylic emulsion comprising water having dispersed therein an emulsion copolymer consisting essentially of at least 65% of $C_1 - C_8$ alcohol esters of acrylic or methacrylic acids and from 0.5–10% of reactive monomers at least about one-third of which are an N-methylol derivative, or a $C_1 - C_8$ alcohol ether thereof, of allyl or methallyl carbamate, any balance of said copolymer being selected from acrylonitrile, styrene, vinyl toluene, vinyl acetate, vinyl chloride and vinylidene chloride, said copolymer having a $T_g$ below 20°C.

11. An emulsion as recited in claim 10 in which said copolymer comprises methyl methacrylate, and a butyl acrylate providing a $T_g$ of from about −20°C. to about 15°C.

12. An emulsion as recited in claim 11 in which said N-methylol derivative is the propyl ether of N-methylol allyl carbamate.

* * * * *

UNITED STATES PATENT OFFICE
CERTIFICATE OF CORRECTION

PATENT NO. : 3,931,086
DATED : Jan. 6, 1976
INVENTOR(S) : Martin K. Lindemann

It is certified that error appears in the above–identified patent and that said Letters Patent are hereby corrected as shown below:

Claim 1, col. 6, line 1, brackets should be placed around the $-R_2O-$ group: $(R_2O)$ Signed and Sealed this thirteenth Day of April 1976

[SEAL]

Attest:

RUTH C. MASON
*Attesting Officer*

C. MARSHALL DANN
*Commissioner of Patents and Trademarks*